United States Patent
Shen et al.

(10) Patent No.: US 9,435,453 B1
(45) Date of Patent: Sep. 6, 2016

(54) DUAL SHOT ONE-WAY DRAIN HOLE PLUG

(71) Applicant: Toyota Motor Engineering & Manufacturing North America, Inc., Erlanger, KY (US)

(72) Inventors: Mingher Fred Shen, Ann Arbor, MI (US); Brandon W. Letcher, Dayton, OH (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 27 days.

(21) Appl. No.: 14/656,775

(22) Filed: Mar. 13, 2015

(51) Int. Cl.
| | |
|---|---|
| *F16K 15/14* | (2006.01) |
| *F16K 24/04* | (2006.01) |
| *B62D 25/24* | (2006.01) |
| *F16K 25/00* | (2006.01) |
| *B60R 13/07* | (2006.01) |

(52) U.S. Cl.
CPC ............ *F16K 24/04* (2013.01); *B60R 13/07* (2013.01); *B62D 25/24* (2013.01); *F16K 15/144* (2013.01); *F16K 15/147* (2013.01); *F16K 25/005* (2013.01); *Y10T 137/6881* (2015.04); *Y10T 137/6892* (2015.04); *Y10T 137/7837* (2015.04); *Y10T 137/7878* (2015.04); *Y10T 137/7884* (2015.04)

(58) Field of Classification Search
None
See application file for complete search history.

(56) References Cited

U.S. PATENT DOCUMENTS

| | | | | | |
|---|---|---|---|---|---|
| 4,179,051 | A | * | 12/1979 | Thomas | A61M 3/0262 137/454.2 |
| 4,434,810 | A | * | 3/1984 | Atkinson | F16K 15/147 137/493 |
| 5,803,074 | A | * | 9/1998 | Pope | A61M 16/0084 128/203.11 |
| 7,243,681 | B2 | * | 7/2007 | Dahm | E03C 1/298 137/843 |
| 7,530,369 | B2 | | 5/2009 | Anderson | |
| 8,739,833 | B2 | | 6/2014 | Maisenhalder | |
| 2008/0185061 | A1 | * | 8/2008 | Fisk | F16K 15/147 137/846 |
| 2008/0196770 | A1 | * | 8/2008 | Ruckel | B60R 13/07 137/354 |

FOREIGN PATENT DOCUMENTS

| | | | | |
|---|---|---|---|---|
| DE | 102007026543 A1 | * | 12/2008 | ............ B62D 25/24 |
| FR | 2890617 A1 | * | 3/2007 | ............ B60R 13/07 |
| GB | 946133 A | * | 1/1964 | ............ B62D 25/24 |
| GB | 1104004 A | * | 2/1968 | ............ B60R 17/00 |
| KR | 2004-0001417 A | | 1/2004 | |

* cited by examiner

*Primary Examiner* — John K Fristoe, Jr.
*Assistant Examiner* — Richard K Durden
(74) *Attorney, Agent, or Firm* — Dinsmore & Shohl LLP

(57) ABSTRACT

A one-way drain hole plug that affords for easy, quick, and proper installation into a panel having drain hole. The one-way drain hole plug includes a seal portion made from a first material and a hollow bulb portion made from a second material that is harder and/or stronger than the first material. The hardness or strength of the second material prevents the hollow bulb portion and the base attached thereto from collapsing during installation of the one-way drain hole plug into the drain hole. However, the first material is soft or pliable enough to allow sufficient deformation of the drain hole insert as it is pushed through the drain hole and provide a liquid-tight fit with the panel.

13 Claims, 2 Drawing Sheets

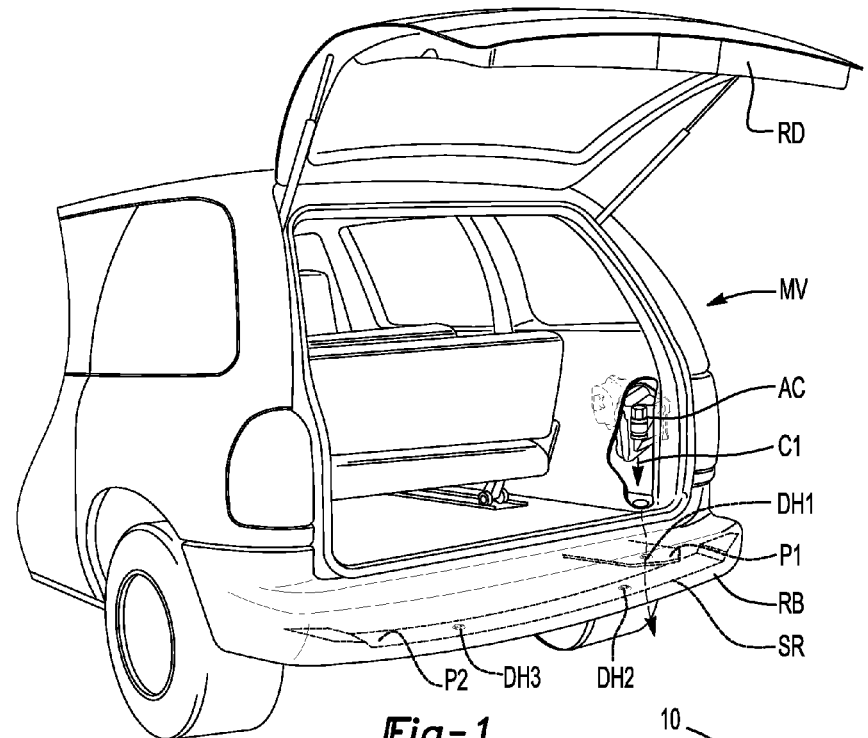
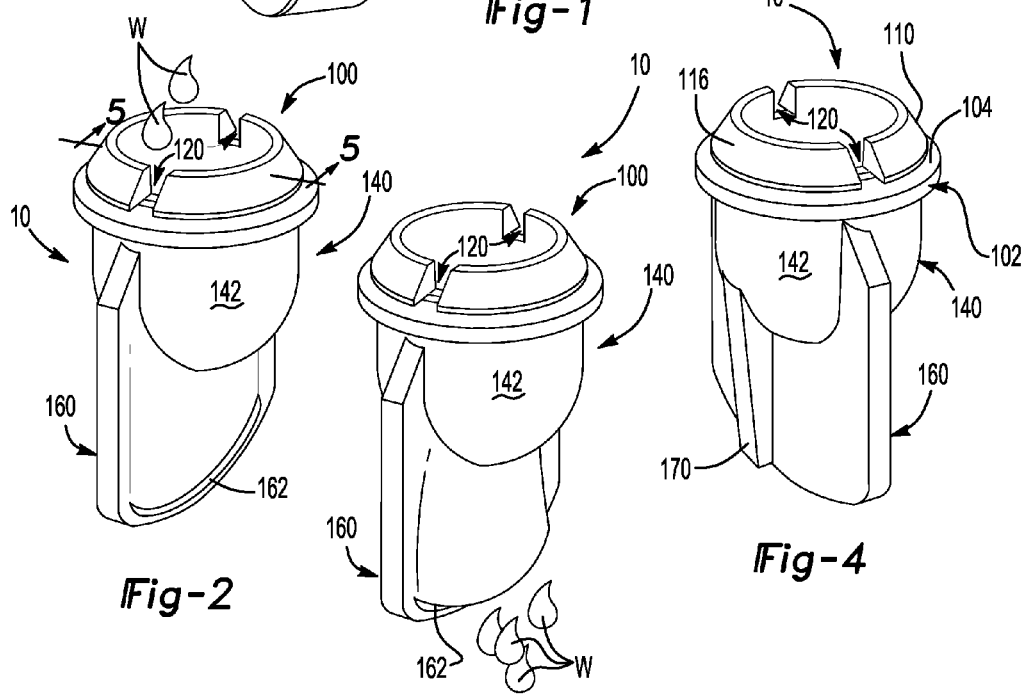

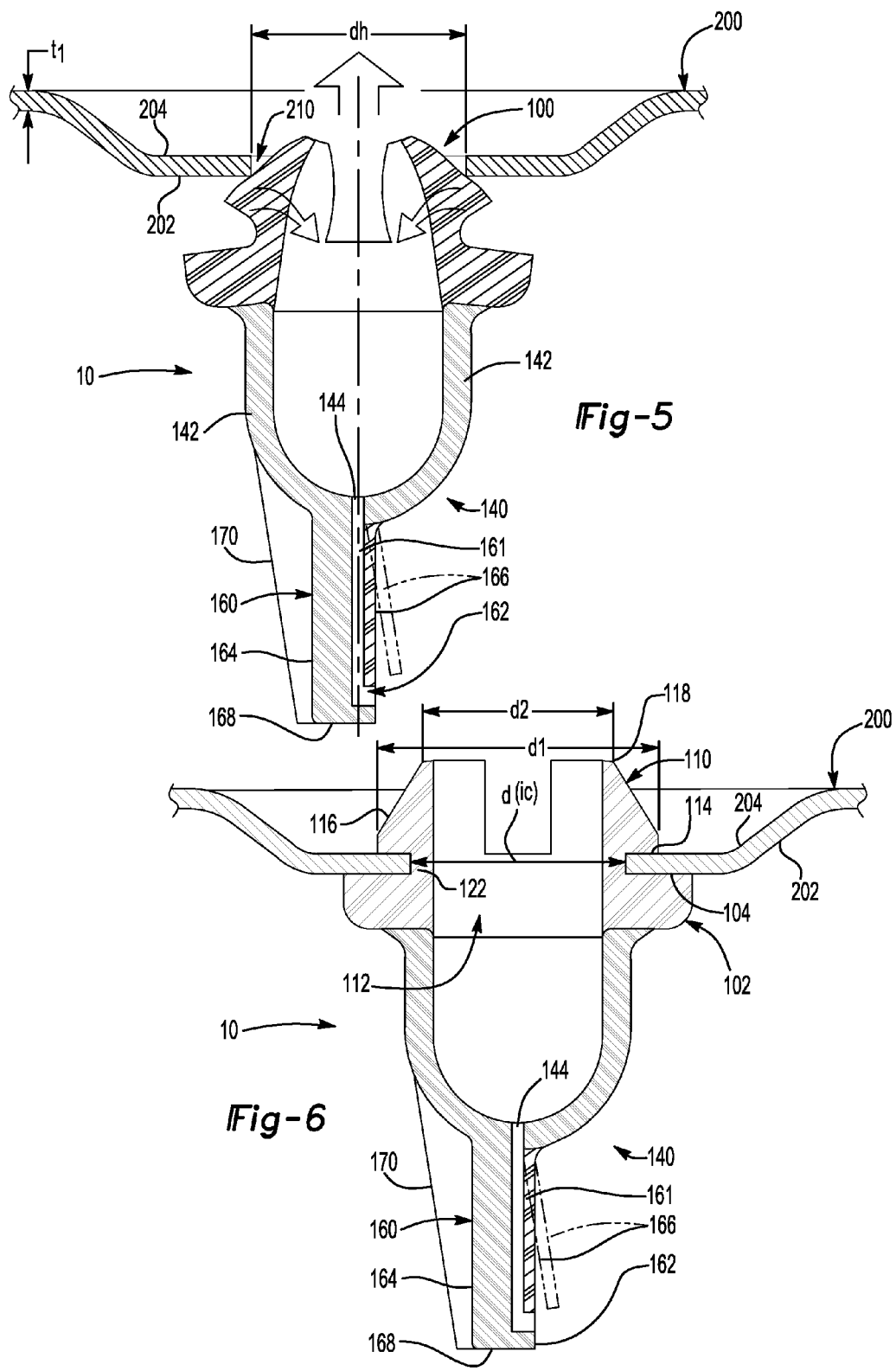

DUAL SHOT ONE-WAY DRAIN HOLE PLUG

FIELD OF THE INVENTION

The present invention is related to a one-way drain hole plug, and in particular to a one-way drain hole plug made from two separate materials that provide improved installation of the one-way drain hole plug during an assembly line manufacturing process.

BACKGROUND OF THE INVENTION

The use of one-way drain hole plugs that allow for liquid to flow out of a compartment but not back into the compartment is known. For example, such drain hole plugs can be used to allow for condensate water from an air conditioner compressor to drain from a compartment via a drain hole containing the air conditioner compressor, but prevent water from entering into the compartment from an opposite direction.

Although useful for providing one-way flow of liquid, the installation of such one-way drain hole plugs during an assembly line manufacturing process can be difficult. In particular, an assembly line worker is typically required to grasp one of the drain hole plugs and properly insert and install the plug within a drain hole in a limited amount of time.

Prior art drain hole plugs have used a sealing portion and a bulb portion made from the same material. In addition, the material is generally soft and pliable such that the sealing portion provides an adequate seal between a panel with the drain hole therewithin and the plug itself. However, such a soft material results in the sealing portion collapsing upon itself when the plug is pushed into a drain hole. Also, the collapse of the sealing portion before it is properly installed within the drain hole can result in extra time needed to install the drain hole plug, delays in the assembly line process, and the like. Therefore, an improved one-way drain hole plug that can be easily and quickly installed into a drain hole during an assembly line manufacturing process would be desirable.

SUMMARY OF THE INVENTION

A one-way drain hole plug that affords for easy, quick, and proper installation into a drain hole is provided. The one-way drain hole plug includes a seal portion made from a first material and a hollow bulb portion made from a second material that is harder than the first material. The seal portion has a base with a panel or bottom flange and a drain hole insert. The drain hole insert has a truncated-cone shape with an inner bore and a bottom edge that is spaced apart from the panel flange. The spacing between the panel flange and the bottom edge of the drain hole insert allows for a panel edge or region that bounds a drain hole within the panel to fit therewithin. The drain hole insert also has an inclined outer sidewall that extends from the bottom edge to a top edge and a sidewall channel that extends through the inclined outer sidewall to the inner bore.

The hollow bulb portion extends from the seal portion and is in fluid communication with the seal portion via the inner bore. The hollow bulb portion has a bottom opening. A hollow flange with a liquid exit slot extends from the hollow bulb portion and is in fluid communication with the bottom opening of the hollow bulb. In this manner, liquid can flow through the sidewall channel of the seal portion, into the hollow bulb, and then exit through the hollow flange.

The first material can be a thermoplastic elastomer having a hardness within a range of 30-60 Shore A and the second material can be a thermoset plastic having a hardness within a range of 65-95 Shore A. The hardness of the second material is such that when the hollow bulb portion is grasped by an assembly line worker, the hollow bulb portion is stiff enough such that it does not collapse. In addition, the non-collapsible hollow bulb portion provides support to the seal portion such that a single push by an assembly line worker on the hollow bulb portion results in the seal portion being correctly installed within the drain hole.

The seal portion can have an inner cylinder that extends between the panel flange of the base and the drain hole insert. The bottom edge of the drain hole insert has a diameter of $d_1$ and the top edge of the drain hole insert has a diameter of $d_2$ that is less than $d_1$.

The hollow flange that extends from the bulb portion has a first side, a second side, and a bottom edge. The first side extends from the hollow bulb portion to the bottom edge and the second side extends from the bulb portion to the liquid exit slot. The liquid exit slot can be located adjacent to the bottom edge of the hollow flange. In addition, the second side of the hollow flange can be made from the first material and thus be flexible and serve as a flapper-type valve.

A process for installing a one-way drain hole plug into a panel having a drain hole is also disclosed. The process includes providing a panel with a drain hole, the panel having a thickness of $t_1$ and the drain hole having a diameter $d_h$. A one-way drain hole plug as disclosed above is also provided. The one-way drain hole plug is installed by grasping the hollow bulb with at least two fingers and pushing the seal portion into the drain hole until the bottom edge of the drain hole insert passes through the drain hole and is located on one side of the panel and the panel flange of the base is located on an opposite side of the panel.

The hardness of the second material is such that it prevents the hollow bulb portion and the seal portion attached thereto from collapsing during installation. As such, an even distribution of force is applied to the seal portion as it is pushed through the drain hole, the uniform force providing a quick installation of the one-way drain hole plug into the drain hole.

The inner cylinder that extends between the panel flange of the base and the drain hole insert has an outer diameter $d_{od}$ that is less than or equal to the drain hole diameter $d_h$. As such, and with the distance between the panel flange and the bottom edge of the drain hole insert being generally equal to or less than the panel thickness $t_1$, the seal portion provides a liquid-tight seal between the one-way drain hole plug and the panel. Stated differently, an interference fit is present between the one-way drain hole plug and the panel. As such, the inventive one-way drain hole plug can be installed within a drain hole that is part of a compartment where liquid can collect. Also, the one-way drain hole plug allows the liquid to exit the compartment but prevents liquid from entering the compartment in an opposite direction. In addition and as stated above, the one-way drain hole plug is easily installed during an assembly line manufacturing process.

BRIEF DESCRIPTION OF THE DRAWINGS

FIG. 1 is a perspective view of a rear portion of a motor vehicle having a plurality of drain holes where a one-way drain hole plug according to an embodiment disclosed herein can be installed and located;

FIG. 2 is a perspective view of a one-way drain hole plug according to an embodiment disclosed herein with liquid entering the drain plug;

FIG. 3 is a perspective view of the one-way drain hole plug shown in FIG. 2 with liquid exiting the drain hole plug;

FIG. 4 is a perspective view of the one-way drain hole plug shown in FIG. 2 with a different orientation;

FIG. 5 is a cross-sectional view of the one-way drain hole plug shown in FIG. 2 being installed into a panel with a drain hole; and FIG. 6 is a cross-sectional view of the one-way drain hole plug shown in FIG. 5 after being installed into the panel with the drain hole plug.

DETAILED DESCRIPTION OF THE INVENTION

A one-way drain hole plug that can be quickly and securely installed within a panel having a drain hole during an assembly line manufacturing process with limited time for installation is provided. The one-way drain hole plug has a seal portion which provides a liquid-tight seal between the one-way drain hole plug and the panel. The one-way drain hole plug also has a hollow bulb portion for liquid that flows or runs off of the panel and through the seal portion to flow therewithin.

The seal portion is made from a first material and the hollow bulb portion is made from a second material. The material of the hollow bulb portion is harder, stronger, stiffer, etc. than the material of the seal portion. In this manner, the seal portion is flexible enough to provide a proper liquid-tight seal between the one-way drain hole plug and the hollow bulb portion is hard and/or strong enough to provide sufficient structural support to the seal portion during installation such that the seal portion does not collapse upon itself and make installation of the one-way drain hole plug difficult.

At a bottom location of the hollow bulb portion is a bottom opening through which liquid can flow. In addition, a hollow flange with a liquid exit slot extends from the bottom location of the hollow bulb and is in fluid communication with the bottom opening of the bulb. The hollow flange has a first side, a second side, and a bottom edge. The first side extends from the hollow bulb portion to the bottom edge and the second side extends from the hollow bulb portion to a liquid exit slot that is located adjacent to the bottom edge. In addition, the second side can be made from the same material as the seal portion such that the second side is flexible, pliable, etc., and serves as a flapper valve that allows water to easily flow through the hollow flange and exit the liquid exit slot. However, when water is not flowing through the hollow flange, the second side prevents liquid from entering back into the hollow bulb portion from an opposite direction.

Turning now to FIG. 1, an illustrative example not meant to limit the scope of the disclosure in any way provides a perspective view of a motor vehicle MV which has a rear air conditioning compressor AC within a compartment C1. In addition, a rear door RD and a rear bumper RB are shown. It is appreciated that condensate from the air conditioner compressor AC can be present within the compartment C1 and collect at a bottom portion or panel P1. As such, the panel P1 has at least one drain hole DH1 through which the condensate can flow. Likewise, the rear bumper RB can have a structural rail SR with a bottom panel P2, the bottom panel P2 having one or more drain holes DH2, DH3 to allow water to flow therethrough and thus not collect within or on the structural rail SR.

It is appreciated that drain holes DH1, DH2, DH3 can have a drain hole plug, and in particular a one-way drain hole plug that allows water or any other liquid to flow and exit the compartment C1, the structural rail SR, and the like. It is also appreciated that such one-way drain hole plugs are typically installed during the manufacture of the motor vehicle MV and thus are installed during an assembly line manufacturing process. As such, workers on the assembly line have limited time to install such one-way drain hole plugs.

An inventive one-way drain hole plug is shown in FIGS. 2-4. In particular, FIG. 2 shows a perspective view of a one-way drain hole plug 10 with liquid W entering into the plug 10. The one-way drain hole plug 10 has a seal portion 100 and a hollow bulb portion 140. The seal portion 100 provides a liquid-tight seal between the one-way drain hole plug 10 and a panel with a drain hole as described in greater detail below.

The seal portion 100 has a base 102 and a drain hole insert 110. In addition, a sidewall channel 120 can extend through the drain hole insert and thus allow liquid W to flow into the hollow bulb portion 140 therethrough. The base 102 has a panel flange 104 and the drain hole insert has an inclined outer sidewall 116. As observed in FIGS. 2-4, the drain hole insert 110 has a truncated-cone shape, for example an inverted truncated-cone shape.

The hollow bulb portion 140 has a sidewall 142 and a hollow flange 160 extending therefrom. The hollow flange 160 has a liquid exit slot 162 which allows the liquid W in FIG. 2 to pass through the hollow bulb portion 140, through the hollow flange 160, and exit the liquid exit slot 162 as illustrated in FIG. 3.

FIG. 4 provides another view of the one-way drain hole plug 10 in which a stiffening ridge 170 is shown extending from the hollow bulb portion 140 along the hollow flange 160.

The seal portion 100 can be made from a first material and the hollow bulb portion can be made from a second material. The first material can be a thermoplastic elastomer having a hardness within a range of 30-60 Shore A and the second material can be a thermoset plastic having a hardness within a range of 65-95 Shore A. It is appreciated that the Shore A hardness values are obtained using a Shore durometer and per the ASTM D2240-00 standard.

Turning now to FIG. 5, a cross-sectional view of the one-way drain hole plug 10 shown in FIG. 4 is illustrated being inserted into a drain hole 210 that is located within a panel 200. The panel 200 has a thickness of $t_1$ and the drain hole 210 has a diameter of $d_h$. As shown by the different crosshatched patterns in the figure, the seal portion 100 is made from a first material and the hollow bulb portion 140 is made from a second material. Furthermore, at least a portion of the hollow flange 160 can also be made from the first material.

With reference to FIG. 6, the one-way drain hole plug 10 is fully installed or located within the drain hole 200. As seen in the figure, the panel flange 104 of the base 102 is located next to and in contact with a bottom side 202 of panel 200. In addition, a bottom edge 114 of the drain hole insert is located next to and is in contact with a top side or surface 204 of the panel 200. Located between the base 102 and the drain hole insert 110 can be an inner cylinder 122. The inner cylinder 122 can have an outer diameter $d_{ic}$ which can be generally equal to or slightly less than the diameter of the drain hole $d_h$. In addition, the distance between the panel flange 104 and the bottom edge 114 can be generally equal to or slightly less than the thickness $t_1$ of the panel 200. In this manner, the seal portion 100 has dimensions that afford for a liquid-tight seal between the seal portion and the panel 200.

The seal portion 100 has an inner bore 112 which naturally allows liquid to flow therethrough. In addition, the seal portion 100 and the hollow bulb portion 140 are in fluid communication with each other via the inner bore 112.

As noted above, the drain hole insert 110 has a truncated-cone shape which is provided by the bottom edge 114 having a diameter $d_1$ and a top edge 118 having a diameter $d_2$ which is less than the diameter $d_1$. As such, an inclined sidewall 116 extends between the bottom edge 114 and the top edge 118.

At a bottom area of the hollow bulb portion 140 is a bottom opening 144. In addition, the hollow flange 160 has a channel 161 in fluid communication with the bottom opening 144. The hollow channel 160 has a first side 164, a second side 166, and a bottom edge 168. The first side 164 can extend from the hollow bulb portion 140 to the bottom edge 168. However, the second side 166 extends from the bulb portion 140 to the liquid exit slot 162 and thus not entirely to the bottom edge 168.

As illustrated in FIGS. 5 and 6, the second side 166 can be made from the same material as the seal portion 100 and thus be relatively soft compared to the remainder of the hollow flange. In addition, the softness of the second side 166 allows for the second side to serve as a flapper valve and thus distort or deform in order to allow liquid to flow from the hollow bulb portion 140 through the hollow flange 160 and exit out the slot 162. In addition, when liquid is not flowing from the bulb portion 140 through the hollow flange 160, the second side 166 is located generally parallel to the first side 164 and thus prevents a direct path between the exit slot 162 and the bottom opening 144. Stated differently, the hollow flange 160 with the second side 166 prevents liquid, dust, debris, and the like from having a direct path between the exit slot 162 and the bottom opening 144. It is appreciated that such a design provides one-way drainage.

As noted in FIG. 5, a force indicated by the broad shape arrow is forcing the one-way drain hole plug 10 in an upward direction and also forcing the seal portion 100 into the drain hole 200. Also, since the bulb portion 140 is made from the second material that is relatively hard compared to the first material, the bulb portion 140 and the base 102 attached thereto are prevented from collapsing during installation of the one-way drain hole plug 10, i.e. during pushing of drain hole insert 110 while through the drain hole 210 of the panel 200. However, the first material is soft or pliable enough to allow sufficient deformation of the drain hole insert 110 as it is pushed through the drain hole 210 and provide a liquid-tight fit.

It is appreciated that a stiffening ridge 170 can be present to provide more support to the bulb portion 140 and/or the hollow flange 160. It is also appreciated that the location of the first side 164 of the hollow flange 160 is offset from a central axis of the one-way drain hole plug 10 such that if the plug 10 is grasped with a thumb and a forefinger, the thumb has more area and thus allows for more gripping area on the hollow bulb portion 140.

It is appreciated that changes, modifications, and the like can be made to the illustrations and embodiments disclosed herein and yet still fall within the scope of the claims. Stated differently, the scope of the invention is defined by the claims and all equivalents thereof.

We claim:

1. A one-way drain hole plug comprising:
   a seal portion made from a first material and a hollow bulb portion made from a second material that is harder than said first material;
   said seal portion having a base with a panel flange and a drain hole insert, said drain hole insert having a truncated-cone shape with an inner bore and a bottom edge that is spaced apart from said panel flange, said drain hole insert also having an inclined outer sidewall extending from said bottom edge to a top edge and a sidewall channel extending through said inclined outer sidewall to said inner bore;
   said hollow bulb portion extending from said seal portion and in fluid communication with said seal portion via said inner bore, said hollow bulb portion having a bottom opening; and
   a hollow flange with a liquid exit slot, said hollow flange extending from said hollow bulb portion and in fluid communication with said bottom opening of said hollow bulb portion such that liquid flows through said sidewall channel of said seal portion into said hollow bulb portion, and through said hollow flange.

2. The one-way drain hole plug of claim 1, wherein said first material is a thermoplastic elastomer having a hardness within a range of 30-60 Shore A and said second material is a thermoset plastic having a hardness within a range of 65-95 Shore A.

3. The one-way drain hole plug of claim 2, further comprising an inner cylinder extending between said panel flange of said base and said drain hole insert.

4. The one-way drain hole plug of claim 3, wherein said bottom edge of said drain hole insert has a diameter of $d_1$ and said top edge of said drain hole insert has a diameter of $d_2$ that is less than $d_1$.

5. The one-way drain hole plug of claim 4, wherein said hollow flange has a first side, a second side and a bottom edge, said first side extending from said hollow bulb portion to said bottom edge and said second side extending from said hollow bulb portion to said liquid exit slot.

6. The one-way drain hole plug of claim 5, wherein said second side is made from said first material.

7. A process for installing a one-way drain hole plug into a panel having a drain hole, the process comprising:
   providing a panel having a thickness of $t_1$ and a drain hole with a diameter of $d_h$;
   providing a one-way drain hole plug having:
   a seal made from a first material and a hollow bulb made from a second material, the second material having a second material hardness that is greater than a first material hardness of the first material;
   the seal having a base attached to the hollow bulb, the base having a panel flange and a drain hole insert, the drain hole insert having a truncated-cone shape with an inner bore and a bottom edge that is spaced apart from the panel flange by a distance $t_1$, the drain hole insert also having an inclined outer sidewall extending from the bottom edge to a top edge and a sidewall channel extending through the inclined outer sidewall to the inner bore;
   the hollow bulb extending from the base of the seal and in fluid communication with the seal via the inner bore, the hollow bulb having a bottom opening that liquid can flow through; and
   a hollow flange with a liquid exit slot, the hollow flange extending from the hollow bulb and in fluid communication with the bottom opening of the hollow bulb such that liquid flows through the sidewall channel of the seal into the hollow bulb, and through the hollow flange;

installing the one-way drain hole plug by grasping the hollow bulb with at least two fingers and pushing the seal into the drain hole until the bottom edge of the drain hole insert passes through the drain hole and is located on one side of the panel and the panel flange of the base is located on an opposite side of the panel, the second material hardness of the second material preventing the hollow bulb and the seal base attached to the hollow bulb from collapsing during installation of the one-way drain hole plug.

8. The process of claim 7, wherein the prevention of the hollow bulb and the seal base from collapsing during installation provides a generally uniform force onto the seal as the seal is pushed into the drain hole.

9. The process of claim 8, wherein the first material is a thermoplastic elastomer and the first material hardness is within a range of 30-60 Shore A and the second material is a thermoset plastic and the second material hardness is within a range of 65-95 Shore A.

10. The process of claim 9, further including the one-way drain hole plug having an inner cylinder extending between the panel flange of the base and the drain hole insert, the inner cylinder having an outer diameter $d_{ic}$ that is less than or equal to the drain hole diameter of $d_h$.

11. The process of claim 10, wherein the bottom edge of the drain hole insert has a diameter of $d_1$ and the top edge of the drain hole insert has a diameter of $d_2$ that is less than $d_1$.

12. The process of claim 11, wherein the hollow flange has a first side, a second side and a bottom edge, the first side extending from the hollow bulb to the bottom edge and the second side extending from the hollow bulb to the liquid exit slot.

13. The process of claim 12, wherein the second side is made from the first material.

\* \* \* \* \*